Patented June 3, 1952

2,599,342

UNITED STATES PATENT OFFICE 2,599,342

INCREASING DRILLING FLUID VISCOSITY

Victor G. Meadors, Tulsa, Okla., assignor to Standard Oil Development Company, a corporation of Delaware No Drawing. Application March 1, 1950, Serial No. 147,141

7 Claims. (Cl. 252—8.5)

The present invention concerns the treatment of drilling fluids employed in the drilling of oil and gas wells. More particularly it relates to the use of certain amino compounds to bring about desired increases in viscosity of bentonitic drilling fluids.

In conventional procedures for drilling oil and gas wells, particularly when the rotary method is employed, it is common practice to circulate around the drill in the bore hole a fluid known as a drilling mud which serves a number of functions, including carrying the bit cuttings out of the bore hole, lubricating the drill pipe and drilling tool, and providing a hydrostatic head in the well to prevent the uncontrolled escape of gases or liquids from various formations encountered during drilling. The drilling mud also serves to form a lining on the wall of the bore hole which helps to prevent the walls of the bore hole from caving and to plug up permeable formations and thereby prevent the flow of fluid from the well bore outwardly into the permeable formations. The normal procedure during drilling is to circulate the mud down through the interior of the drill pipe and then back up to the surface through the annulus between the drill pipe and the wall of the bore hole. The drilling fluid issuing from the well is usually passed over a screen and then through a ditch or trough to a mud pit, to be recirculated through the drill pipe by suitable pumps.

The most common type of drilling mud is essentially a dispersion of a finely divided colloidal material, such as clay, bentonite or the like, in water, together with other materials so that the mud will have the special properties required to perform the several functions enumerated above. The properties of the mud that are of principal concern are viscosity, gel strength, and density. The proper density is necessary to furnish sufficient hydrostatic head in the borehole so that the pressure exerted will exceed that of the various fluids encountered in the formations traversed by the borehole. Weighting materials such as silica, iron oxide or barytes, more commonly the latter, are usually added to the drilling mud to impart the proper density. Viscosity and gel strength are imparted by the clay or bentonite component. A typical drilling mud will have a density of from 9 to 18 pounds per gallon and in general, for satisfactory drilling, will have a viscosity below about 60 centipoises at 75° F. as measured on the Stormer viscosimeter at 600 R. P. M.

The gel forming and viscosity characteristics of a drilling fluid are by far the most important. In order to perform the function of carrying cuttings from the drill bit to the earth's surface where the cuttings drop out in the mud pit the drilling fluid must have a selected viscosity such that the fluid may be pumped through the system and also such that the cuttings will remain suspended in the fluid during the flow of the fluid up the borehole. Also, the fluid, when it is relatively quiescent, should permit the cuttings to fall a few feet since it is essential that the cuttings settle out at the surface. On the other hand, the fluid should have the property of gelling on standing, in order to avoid permitting undue settling of the cuttings in the well itself when drilling and circulation of fluid are temporarily halted. Accordingly, a drilling fluid should be thixotropic, i. e., it should be fluid when subjected to agitation but when standing should set to a gel of sufficient strength to retain cuttings in the time required for the cuttings to settle a few feet.

The properties of a drilling fluid are changed during drilling because the hole traverses strata which are composed of shales, clays, etc., which become dispersed in the fluid. When the strata encountered contain certain clays or such materials as alkaline earth metal compounds, particularly calcium compounds, or when cement is being drilled out, the drilling fluid is liable to become too viscous. In drilling a well in many fields it is necessary to keep a close watch on the drilling fluid and to treat it with chemicals at the surface so as to counteract the effect of contaminants.

When the drilling mud has become too viscous it is necessary to add a viscosity reducing agent. However, most of the materials commonly employed suffer from the disadvantage of being subject to hydrolysis, which reduces their effectiveness for this purpose. This is particularly true of the alkali metal polyphosphates such as sodium tetraphosphate. Since the products of hydrolysis are relatively ineffective as viscosity reducers, this makes it necessary to repeat the treatment at regular intervals, the frequency of the treatment being governed by the rate of hydrolysis of the treating agent. This continued treatment results in a gradual increase in the concentration of the hydrolysis products. Since the hydrolysis products of many commonly used treating agents are inorganic salts, high concentrations of which are effective flocculating agents for clays, a point is soon reached where further treatment is of no value because the effect of the additional treating agent is not sufficient to overcome the flocculating action of the salts already present in the mud. A mud which has been treated to this extent so that it is not susceptible to further treatment is said to be overtreated and presents a serious problem because of the difficulty involved in controlling its properties.

In order to restore the desired viscosity to a drilling mud which has too low a viscosity as a result of overtreatment, it is advantageous to add a thickening agent. Thickening agents are also of value when rotary drilling operations are being carried out in inaccessible locations where the price of bentonite becomes excessive because of shipping charges. In the latter case the use of a thickening agent permits the production of a suitable mud with far less bentonite than would otherwise be possible. Suspensions of bentonite are known to be thickened and gelled by inorganic salts such as $NaCl$, $CaCl_2$, $MgCl_2$, $CaSO_4$ and the like. However, these materials are of little practical value as thickening agents for bentonite suspensions since it is difficult to control the viscosity within reasonable limits. It is also difficult to avoid overtreatment of the mud when treating with these materials.

The need for more reliable thickening agents is thus apparent and it is one object of the present invention to provide efficient viscosity increasing agents for drilling fluids which will not possess the disadvantages inherent in the inorganic thickening agents.

In accordance with the present invention drilling fluids comprising aqueous dispersions of clays, and particularly of bentonite, are increased in viscosity by adding thereto viscosity increasing amounts of organic nitrogen compounds selected from the class consisting of piperidine, piperidine homologues, and aliphatic and cycloaliphatic amines having dissociation constants of at least $1 \times 10^{-4}$ and having a total of not more than 15 carbon atoms and preferably not more than 12 carbon atoms in the molecule. These compounds, when added to a 6% slurry of bentonite in water at the rate of 0.1 mol per liter of slurry, bring about at least a 100% increase in viscosity. Other amines and related nitrogen compounds having dissociation constants in the range of $1 \times 10^{-9}$ or lower are ineffective for the purposes of this invention since they give either only slight increases in viscosity or else actually reduce the viscosity.

The effect of the amino compounds of this invention in increasing the viscosity of an aqueous dispersion of bentonite and the negligible or adverse effect of amino and other nitrogen compounds outside the class defined above are shown in the following table. In each case the compound used was added to a 6 per cent bentonite slurry in the amount of 0.1 mol per liter of slurry. This slurry, before adding any of the materials mentioned below, was found to have a viscosity of 7 centipoises at 75° F., as measured by the Stormer viscosimeter at 600 r. p. m.

| Nitrogen Compound | Dissociation Constant | Per Cent Increase in Viscosity |
|---|---|---|
| Methyl amine | $5 \times 10^{-4}$ | 120 |
| Dimethyl amine | $5.2 \times 10^{-4}$ | 500 |
| Diethyl amine | $1.3 \times 10^{-3}$ | 400 |
| Triethyl amine | $6.4 \times 10^{-4}$ | 500 |
| n-Butyl amine | $4.1 \times 10^{-4}$ | 500 |
| Tri-n-butyl amine | $1 \times 10^{-4}$ | 1,470 |
| n-Amyl amine | $4.3 \times 10^{-4}$ | 985 |
| Tri-n-amyl amine | $1 \times 10^{-4}$ | 1,050 |
| Cyclohexyl amine | $1.6 \times 10^{-4}$ | 1,450 |
| Piperidine | $1.6 \times 10^{-3}$ | 600 |
| Monoethanol amine | $2.8 \times 10^{-5}$ | 30 |
| Diethanol amine | $7.6 \times 10^{-6}$ | 40 |
| Triethanol amine | $5.9 \times 10^{-7}$ | 30 |
| Pyridine | $2.3 \times 10^{-9}$ | 15 |
| 2, 6-Diamino pyridine | $1 \times 10^{-10}$ | 46 |
| Urea | $1.5 \times 10^{-14}$ | 5 |
| Thiourea | $1.1 \times 10^{-15}$ | −10 |
| Aniline | $4.6 \times 10^{-10}$ | −20 |
| Dimethyl aniline | $4 \times 10^{-10}$ | −10 |
| n-Phenylene diamine | $3 \times 10^{-10}$ | −30 |

It will be seen from these data that the amino compounds falling within the class defined above brought about viscosity increases of at least 100 per cent and in some cases up to 1000 or 1500 per cent; whereas those amino and other nitrogen compounds falling outside the defined class brought about viscosity increases of less than 50 per cent or else actually caused a decrease in viscosity. Tri-n-amyl amine, having a total of 15 carbon atoms in the molecule, gave a satisfactory increase in viscosity but falls just on the borderline of desired additives because of its very slight solubility. Hence it is preferred that the amino compound have not more than about 12 carbon atoms per molecule, although, as noted, as many as 15 carbon atoms may be present.

In addition to the amines listed above it is also contemplated to employ octyl amine, isooctyl amine, and lauryl amine in practicing this invention. In some instances it may be advantageous to employ mixtures of two or more of the amines covered by the defined class. Particularly preferred for use in this invention are dimethyl amine, diethyl amine, piperidine, triethyl amine and n-butyl amine.

In practicing this invention it is contemplated that the nitrogen compounds employed will be added to the drilling fluid in concentrations of about 0.1 to about 10% and preferably in concentrations of about 0.1 to about 5%.

It should be pointed out that, in drilling mud compositions prepared by dispersing bentonite or other clays in water, the dispersed particles of the colloidal composition will ordinarily carry a negative charge. In some instances special drilling muds are prepared in which basic substances, such as a basic dye for example, are added to a clay or bentonite dispersion to impart a positive charge to the particles, in order to render the drilling mud especially useful for preventing heaving of shales in certain areas being drilled or to prevent foaming and gas-cutting of the mud. The amino compounds of the present invention will in many instances not be satisfactory when used in such special drilling muds since in some cases these amines will cause undesirable flocculation of the mud carrying positively charged particles. Hence these additives are intended primarily for the usual type of drilling mud in which the particles are negatively charged.

This invention is to be limited only by the appended claims and not in any manner by the specific examples given.

What is claimed is:

1. A drilling fluid comprising an aqueous dispersion of a clay to which has been added a viscosity increasing amount of an organic nitrogen compound selected from the class consisting of piperidine, piperidine homologues, and aliphatic and cycloaliphatic amines, said nitrogen compound having a dissociation constant of at least $1 \times 10^{-4}$ and having a total of not more than 15 carbon atoms in the molecule, said drilling fluid having a density in the range of 9 to 18 lbs. per gallon.

2. Drilling fluid according to claim 1 in which the nitrogen compound is employed in concentrations of the range of 0.1 to 5%.

3. A drilling fluid comprising an aqueous dispersion of bentonite and from 0.1 to 5% of dimethyl amine, said drilling fluid having a density in the range of 9 to 18 lbs. per gallon.

4. A drilling fluid comprising an aqueous dispersion of bentonite and from 0.1 to 5% of piperidine, said drilling fluid having a density in the range of 9 to 18 lbs. per gallon.

5. A drilling fluid comprising an aqueous dispersion of bentonite and from 0.1 to 5% of diethyl amine, said drilling fluid having a density in the range of 9 to 18 lbs. per gallon.

6. A drilling fluid comprising an aqueous dispersion of bentonite and from 0.1 to 5% of n-butyl amine, said drilling fluid having a density in the range of 9 to 18 lbs. per gallon.

7. A drilling fluid comprising an aqueous dispersion of bentonite and from 0.1 to 5% of triethyl amine, said drilling fluid having a density in the range of 9 to 18 lbs. per gallon.

VICTOR G. MEADORS.

REFERENCES CITED

The following references are of record in the file of this patent:

UNITED STATES PATENTS

| Number | Name | Date |
|---|---|---|
| 2,033,856 | Smith | Mar. 10, 1936 |
| 2,280,997 | Booth | Apr. 28, 1942 |
| 2,320,009 | Ralston et al. | May 25, 1943 |
| 2,495,255 | Hoehn | Jan. 24, 1950 |
| 2,497,579 | Bried | Feb. 14, 1950 |